No. 683,950. Patented Oct. 8, 1901.
C. H. LEGGETT.
PORTABLE POWDER DISTRIBUTER.
(Application filed July 1, 1901.)
(No Model.) 2 Sheets—Sheet 1.
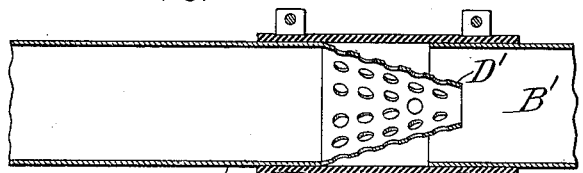
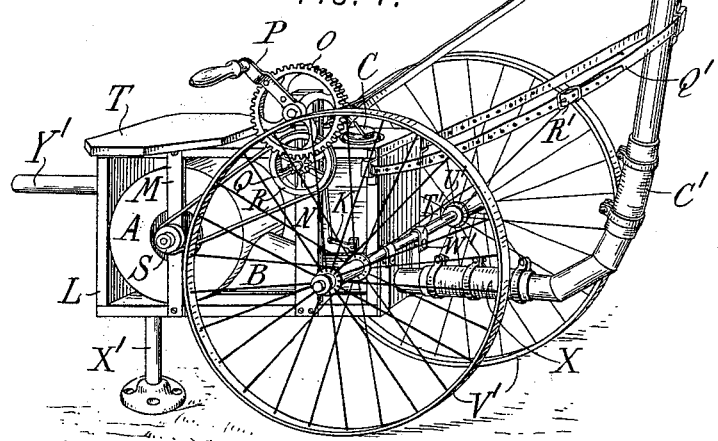
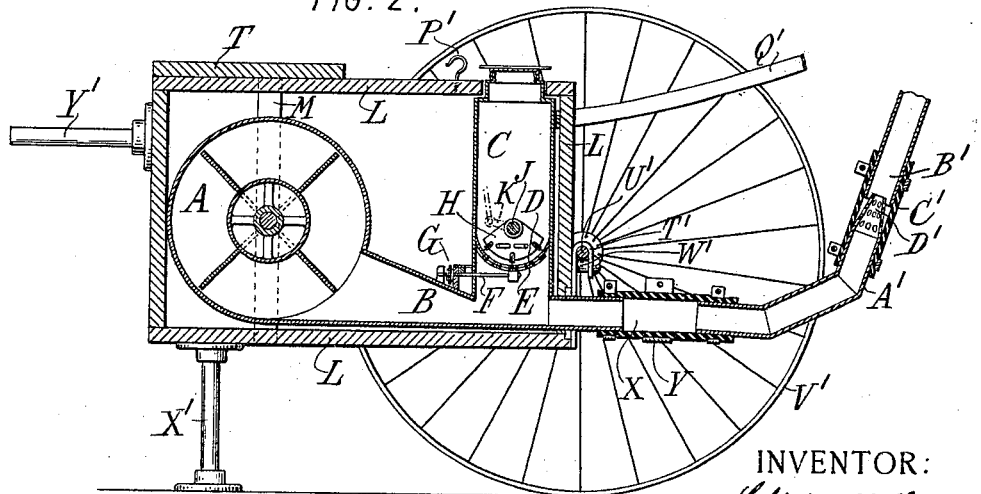
WITNESSES:
INVENTOR:
Clinton H. Leggett,
By Attorneys,
THE NORRIS PETERS CO., PHOTO-LITHO., WASHINGTON, D. C.

No. 683,950. Patented Oct. 8, 1901.
C. H. LEGGETT.
PORTABLE POWDER DISTRIBUTER.
(Application filed July 1, 1901.)
(No Model.) 2 Sheets—Sheet 2.

WITNESSES:
René Bruine
Domingo N. Maria

INVENTOR:
Clinton H. Leggett,
By Attorneys,
Arthur C. Fraser

UNITED STATES PATENT OFFICE.

CLINTON H. LEGGETT, OF NEW YORK, N. Y.

PORTABLE POWDER-DISTRIBUTER.

SPECIFICATION forming part of Letters Patent No. 683,950, dated October 8, 1901.

Application filed July 1, 1901. Serial No. 66,653. (No model.)

*To all whom it may concern:*

Be it known that I, CLINTON H. LEGGETT, a citizen of the United States, residing in the borough of Manhattan, city, county, and State of New York, have invented certain new and useful Improvements in Portable Powder-Distributers, of which the following is a specification.

My invention aims to provide certain improved means for distributing powder onto plants, trees, or the like, whereby a great deal of labor is saved over the methods at present in use as well as a great deal of time, whereby the powder may be directed and distributed quickly and accurately on the tops of trees of considerable height or may be spread out to dust several rows of plants, or, in fact, directed in any way desired, whereby the apparatus may be conveniently carried by hand from one point to another or may be mounted on the back or other part of a wagon to be carried from one point to another.

My invention aims also to provide various other improvements, as hereinafter set forth in detail.

Figure 4:
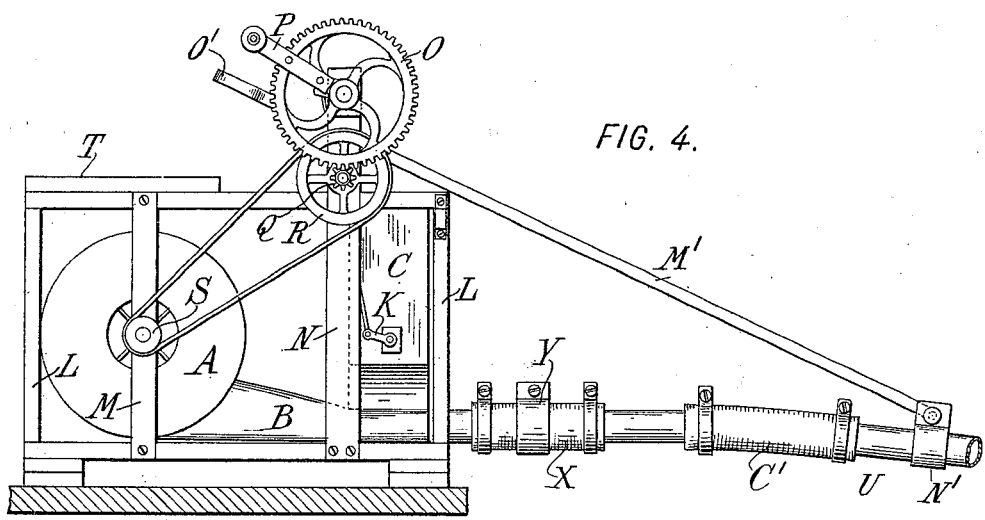
Figure 5:
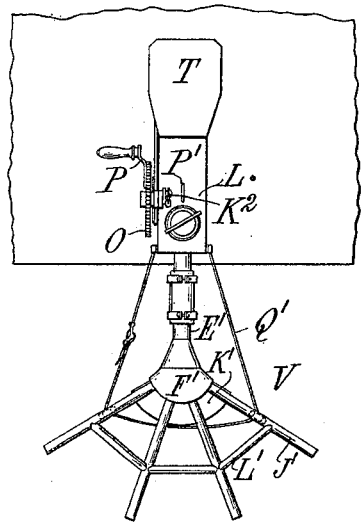
Figure 6:
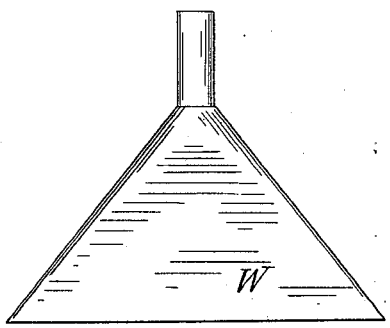
Figure 7:
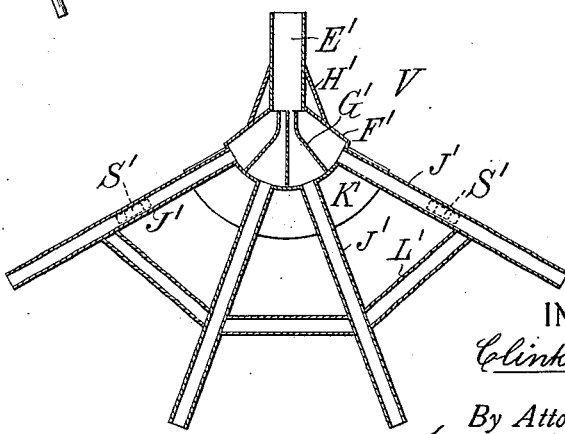

Referring to the accompanying drawings, representing a practical embodiment of my invention, Figure 1 is a view in perspective of a complete apparatus. Fig. 2 is a partial section, on a larger scale, of the same apparatus. Fig. 3 is a section of a portion of a nozzle. Fig. 4 is a side view of an apparatus mounted on the floor of a wagon. Fig. 5 is a plan of the same, a different nozzle being employed. Fig. 6 is a plan of a spreading-nozzle, and Fig. 7 is a horizontal section of another spreading-nozzle.

In Patent No. 511,781, dated January 2, 1894, and various other patents of mine I have described powder-distributers adapted to be held in one hand and operated by the other to distribute powder. The capacity of such dusters is limited, however. With the apparatus of my present invention I am enabled to distribute the powder in large quantities, so as to dust large trees in an orchard or several rows of plants simultaneously. For convenience the blower or fan, reservoir, and spout employed are preferably of the type described in my above-mentioned patent, though any other suitable forms of these elements of the apparatus may be used. All parts of the apparatus, however, are made larger than for a hand apparatus, and means are preferably provided for attaching a pair of wheels at one end and a standard at the other, so as to roll it from place to place or to stand it in one place while the operator, preferably sitting on a seat provided for the purpose, operates the blower. A handle may also be provided at one end for convenience in rolling it from place to place. When the wheels, standard, and handle, however, are detached, the apparatus is adapted to be mounted on the floor of a wagon—for example, at the back thereof.

The discharge-pipe from the blower is preferably flexibly mounted, and I provide a series of nozzles adapted for attachment to such spout in order to vary the manner of distribution of the powder. The nozzles may be manipulated in any desired way to direct the discharge in different directions; but I preferably provide means within reach of the operator, sitting on the seat referred to, whereby the discharge may be directed up, down, or sidewise at will. This means preferably comprises a rod attached at one point to the nozzle and adapted to be held in the left hand of the operator while he operates the blower with his right hand. I may also provide an adjustable connection between the fixed parts of the apparatus and the nozzle, so as to set the same fixedly in any position of adjustment.

Referring now to the drawings, A is a blower of any usual or suitable type, preferably a rotary blower, sucking in air at the sides and discharging through a discharge-tube B. C is a reservoir for containing the powder to be distributed and from which the powder drops into the discharge-tube B of the blower and is carried along by the current of air. The bottom D of the reservoir C is perforated, as shown, and is closed or opened by a plate E, having similar perforations and adapted to be set in any desired position by means of an adjusting-rod F, attached to said plate and operated from the exterior, as by means of a wheel G. An agitator H inside the reservoir is mounted on a shaft J, which is operated, as shown, by a crank K and link at the outer side of the reservoir. These parts are substantially identical with those shown in my patent above referred to. The link may be oscillated by a crank K², Fig. 5.

For convenience in supporting the blower on the floor of a wagon or the like it is surrounded by a box-like casing L, open at the sides, as shown.

M represents bars connecting the upper and lower members of the frame L and through which passes also the shaft of the blower A. By this construction the blower is held firmly in place and its position within the box is fixed. It is prevented from any rotary movement within the box by the front piece of the frame L, which incloses the discharge-pipe B of the blower. An upright N on one side of the frame carries the operating mechanism for the blower, which comprises, preferably, a gear O, driven by a crank P and gearing with a pinion Q, which is fixed on the same shaft with a large pulley R, which is connected by a belt, as shown, to a small pulley S on the shaft of the blower.

T is a seat mounted at the rear of the frame L and in convenient position for the operator to turn the operating-lever P. It will be seen that this forms a very convenient arrangement of distributing apparatus, all the parts being easily and conveniently accessible, the whole being capable of setting in any desired point and of being operated in comparative comfort by the operator.

It is my purpose to adapt the invention for use either with trees, as in an orchard, or with small plants on the ground or with plants of medium height—in fact, to make it universal in its application, and for this purpose I preferably provide a series of discharge-nozzles adapted to be flexibly connected to the discharge-pipe B of the blower. For use on high trees I preferably provide the nozzle T², Fig. 1, while for low trees I may use either the same nozzle or the nozzle U, Figs. 3 and 4. For spreading the discharge over a plurality of rows as the apparatus is moved along either by being carried on the rear of a cart or otherwise I may use the spreading-nozzle V, Figs. 5 and 7, or the spreading-nozzle W, Fig. 6, or I may combine these two. The discharge end of the fan is preferably provided with a flexible joint by the use of a flexible tube X, which is clamped on the end thereof and which is adapted to be clamped at its opposite end to the nozzle, and which is provided also with an intermediate stiffening-clamp Y to prevent its collapsing when bent. It will be understood that the material of this joint is of sufficient strength to sustain the weight of the nozzle under ordinary circumstances. The nozzle T², used for high trees, is preferably provided with a curved upper end, as shown, and a reversely-curved lower end adapted for connection with the flexible joint X, and is also provided, preferably, with an intermediate flexible joint comprising the rigid sections A' B', united by an intermediate length of flexible material C', the end D' of the section A' being reduced and entering the end of the section B'. This serves also to prevent collapsing of the flexible section C' at an intermediate point. The section C' is preferably tapered and perforated along its sides, so as to provide a large outlet, and thus avoid obstructing the passage of air and dust through the nozzle. In place of the upwardly-curved nozzle T it may be desired to dust trees at about or immediately below the level of the wagon-floor, in which case a substantially straight nozzle U may be used, connected to the flexible member X of the discharge-pipe in the manner as explained for the nozzle T² and having at an intermediate point a similar flexible joint composed of rigid parts A' B', an intermediate flexible section C', and a perforated tapered end D' of the section A'. The nozzle V is preferably used in dusting several rows of plants lying on the ground, and is adapted, like the other nozzles, for direct connection with the flexible section X. The main section E' of the nozzle V branches into a dividing-chamber F', having separating partitions or diaphragms G', which separate the dust coming from the section E' into four substantially equal portions. Lateral braces H' give strength to the connection between the section E' and the chamber F'. Discharging from the chamber F' is a series of (in this case four) branches J', the connection between the branches and the chamber F' being stiffened and strengthened by flanges K' and by cross bars or tubes L', connecting the adjacent branches. In this nozzle I provide a durable and simple means of securing an equal distribution of the dust to as many separate points as desired. The several tubes are preferably constructed of comparatively thin sheet metal, and therefore the stays and stiffening-pieces inserted are very useful in holding the parts together and in their proper relative positions.

Where it is desired to spread out the dust rather than to distribute it to several separate points, I may use a spreading-nozzle W, which may be substantially identical with that described in my previous patent referred to above, or I may use such a spreading-nozzle W, attached at the end of each or any of the branches J' of the nozzle V or at the end of either of the other nozzles shown. In fact, any combination of nozzles may be utilized which will secure the desired direction of the discharge of the dust. The nozzles may be manipulated by a second operator holding the nozzle directly in his hand, moving the nozzle during the operation of the blower to any desired point, or by means of a rod M', Figs. 1 and 4, attached at one end to the nozzle by means of a clamp N' at any suitable point and extending within reach of the hand of the operator seated on the seat T. The operator may direct the discharge with his left hand while he works the machine with his right, or the nozzle may be held in a fixed position by hooking the eye O', Fig. 4, in the end of the rod M' over a hook P', Figs 2 and 5. It may, however, be desired to adjust the nozzle from one fixed position to another fixed position without having an extra man to hold it there, and for this purpose I may provide a strap Q', passing around the nozzle and around the front side of the frame L, as shown best in Fig. 1, this strap being of adjustable length, as by means of a buckle R'. With the nozzle T² it is not necessary to provide any special holder for holding the strap Q' at a particular point of the nozzle; but for the nozzle V, I prefer to provide a pair of guides S' at opposite sides, through which the strap Q' may pass. Thus by my improved apparatus the discharge may be directed upward, downward, sidewise, or may be varied at will or may be set in any desired fixed position of adjustment, so that it is adapted for all cases which may arise in practice.

Where it is not convenient to mount the apparatus on the rear of the wagon, it is adapted for the attachment of wheels direct, so as to make it portable without the assistance of a wagon. For this purpose I provide on the front of the frame L a pair of straps T', adapted to receive the axle U' of a pair of wheels V'. Screws W' prevent accidental separation of the axle from the frame of the apparatus. When it is to be used with wheels of its own, I preferably provide also a standard X', adapted for attachment to the rear, and a handle Y', by which the rear end may be lifted and the apparatus pushed along like a hand-cart. Quite large easy-running wheels may be employed without raising the apparatus an excessive distance from the ground, thus securing ease of locomotion. The rear portion near the seat is entirely free for the legs of the operator sitting there, and the wheels are so far apart as to give perfect freedom in the movement of the operating-lever P. All the parts, in fact, are most conveniently arranged for making the operation of the apparatus as easy as possible.

It will be seen that my invention provides a dusting apparatus of a wide range of applicability, useful for trees, bushes, vines, or low plants, of stiff strong construction and easy operation. By the use of my improved apparatus a large area of plants can be dusted in a comparatively short time and without unnecessary labor. The construction is simple and not liable to get out of order.

It will be understood that various details and arrangements may be modified by those familiar with the art without departing from the spirit of the invention. Therefore though I have described with great particularity of detail an apparatus embodying my invention yet I do not wish to limit myself to the particular embodiment shown and described.

What I claim is—

1. The combination in a powder-distributer of a fan, a seat, a discharge-nozzle flexibly connected to said fan, and means accessible from said seat for operating said fan.

2. The combination in a powder-distributer of a fan, a seat, a discharge-nozzle flexibly connected to said fan, and means accessible from said seat for operating said fan and for directing said nozzle.

3. The combination in a powder-distributer of a fan, a section of pipe flexibly connected to said fan, and a series of discharge-nozzles for varying the direction of the powder, said nozzles being adapted for attachment to the end of said section of pipe.

4. The combination with a powder-distributer, of a fan, a seat, a discharge-nozzle flexibly connected to said fan, and means accessible from said seat for operating said fan and for fixedly adjusting the direction of said nozzle.

5. The combination in a powder-distributer of a fan, a pair of wheels adapted for attachment thereto, a supporting-standard, a handle, and means for operating said fan and for directing the discharge thereof.

6. The combination with a powder-distributer of a fan, a frame attached to and carrying the same, a seat on said frame, a pair of wheels adapted for attachment thereto, a supporting-standard therefor, a handle, and means for operating said fan and for directing the discharge thereof.

7. The combination in a powder-distributer of a fan, a frame attached to and supporting the same, a seat on said frame, a pair of wheels adapted for attachment thereto, a supporting-standard, a handle, and means accessible from said seat for operating said fan.

8. The combination in a powder-distributer of a fan, a frame attached to and supporting the same, a seat on said frame, a pair of wheels adapted for attachment thereto, a supporting-standard, a handle, and means accessible from said seat for operating said fan and for directing said nozzle.

9. The combination in a powder-distributer of a fan, a frame attached to and supporting the same, a seat on said frame, a pair of wheels adapted for attachment thereto, a supporting-standard, a handle, and means accessible from said seat for operating said fan and for directing said nozzle, and means for fixedly adjusting the direction of said nozzle.

10. In a powder-distributer, a discharge-nozzle comprising a pair of rigid sections, and an intermediate flexible section, one of said rigid sections having a reduced end entering the other, whereby the flexible section is prevented from collapsing.

In witness whereof I have hereunto signed my name in the presence of two subscribing witnesses.

CLINTON H. LEGGETT.

Witnesses:
DOMINGO A. USINA,
FRED WHITE.